Aug. 12, 1969 — N. CANZONERI — 3,460,321
METHOD OF MAKING AN AIR FILTER
Filed Sept. 27, 1967 — 3 Sheets-Sheet 1

INVENTOR.
Nicholas Canzoneri
BY Hill, Sherman, Meroni, Gross & Simpson ATTORNEYS Aug. 12, 1969  N. CANZONERI  3,460,321
METHOD OF MAKING AN AIR FILTER
Filed Sept. 27, 1967  3 Sheets-Sheet 2

INVENTOR.
Nicholas Canzoneri
BY
ATTORNEYS

Aug. 12, 1969 — N. CANZONERI — 3,460,321
METHOD OF MAKING AN AIR FILTER
Filed Sept. 27, 1967
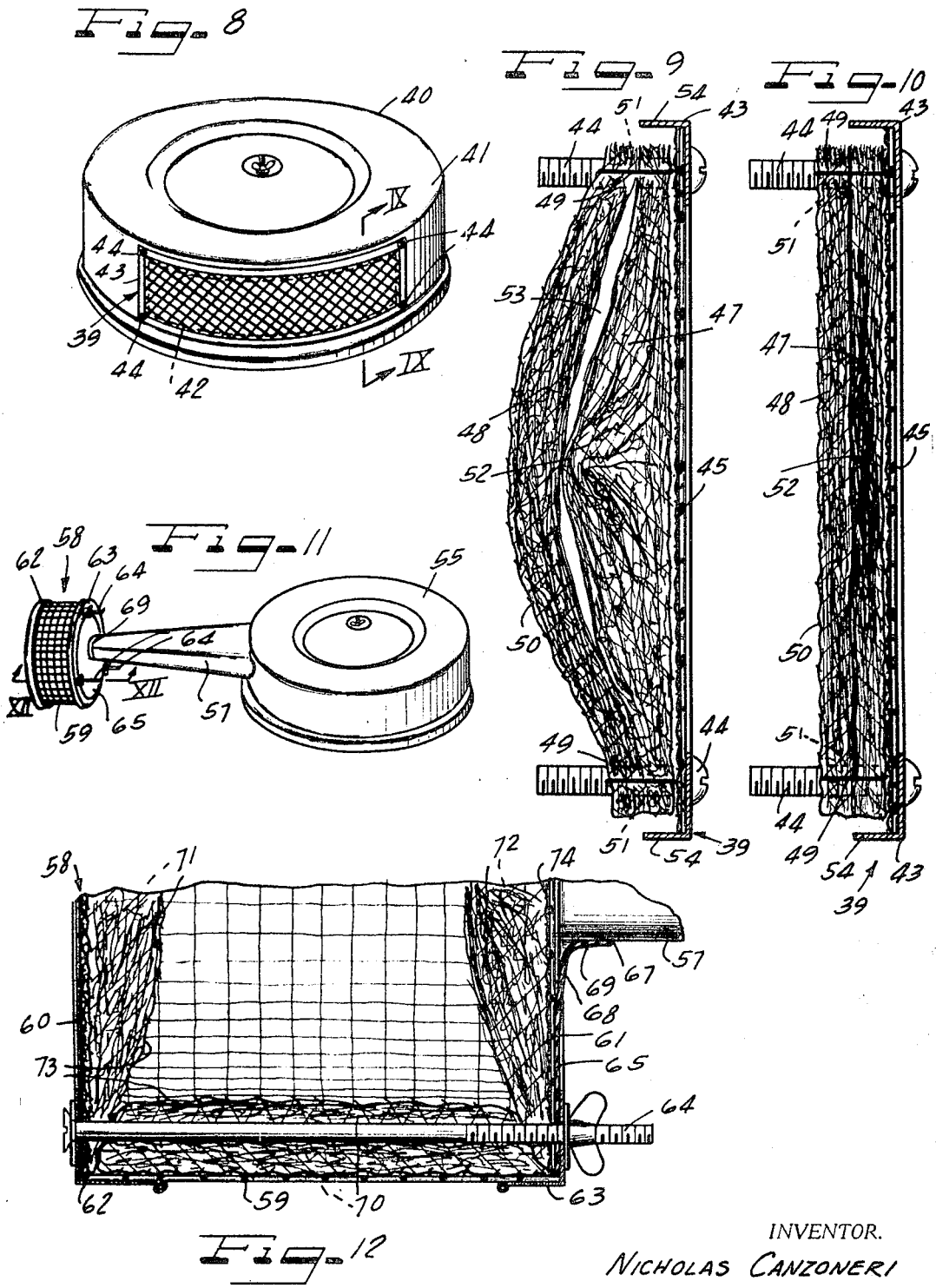
INVENTOR.
NICHOLAS CANZONERI

3,460,321
METHOD OF MAKING AN AIR FILTER
Nicholas Canzoneri, 1148 N. Lawndale Ave.,
Chicago, Ill. 60651
Continuation-in-part of application Ser. No. 420,520,
Dec. 23, 1964. This application Sept. 27, 1967, Ser.
No. 675,743
Int. Cl. B01d 39/00
U.S. Cl. 55—495                                           4 Claims

ABSTRACT OF THE DISCLOSURE

A method of making an air filter which comprises assembling a dry compressed flattened loofah skeleton layer filter medium and a retaining structure together, and thereafter moistening and swelling the layer toward its original uncompressed condition and drying the same.

---

This application is a continuation-in-part of my co-pending application Ser. No. 420,520, filed Dec. 23, 1964, now abandoned.

This invention relates to improvements in air filters and a method of making the same from loofah skeleton material utilized as the principal filter medium, the invention being highly desirable for use in heating systems, air conditioning systems, air intakes for for internal combustion engines, and in many other locations that will be known to those skilled in the art, for the purpose of cleaning passing air of dust, dirt, foreign particles, and the like.

While in the past many and various materials have been used as filter media for air, and in many cases combinations or assemblies of different materials have been used in the same filter, in no instance of which I am aware has flattened loofah skeleton been utilized for this purpose.

Loofah is the fruit of tropical cucurbitaceous plants constituting the genus Luffa and certain species of this genus, such for example as *Luffa cylindrica, Luffa agyptiaca,* and *Luffa acutangula,* among others, bear a fruit in the nature of a gourd which has a closely netted vascular bundle in the pericarp, and the fibrous skeleton of such fruit has heretofore been utilized for sponges, frequently termed vegetable sponges.

Loofah fiber possesses definite advantages over various materials used heretofore as filter media for air, such as economy in the original cost of the fiber, in the ease of handling the fiber, in the ease of shaping the fiber to function in various types of filter elements, and in the lack of various treatments necessitated by filter media known heretofore. Other advantages reside in the fact that the loofah fiber element may be cleaned and reused, is highly efficient, extremely light in weight, and can readily be used to provide filter elements of various densities.

Accordingly, it is an important object of the instant invention to provide an air filter in which the filter medium is flattened loofah skeleton.

Another important object of the invention is to provide a novel method of making air filters from loofah skeleton material.

Also an object of this invention is the provision of a loofah fiber air filter which can be made in various sizes and shapes to accommodate various air filtering applications.

While some of the more salient features, characteristics and advantages of the instant invention have been above pointed out, others will become apparent from the following disclosures, taken in conjunction with the accompanying drawings, in which:

FIGURE 8 is perspective view of an automotive air cleaner;

FIGURE 9 is a substantially enlarged sectional detail view of the air filter structure of the air cleaner of FIGURE 8 taken substantially along the line IX—IX;

FIGURE 10 is a view similar to FIGURE 9 but showing the loofah layers in the state of flattened compaction at completion of assembly and before expansion by moistening thereof;

FIGURE 11 is a perspective view of another automotive air cleaner showing a modified filter construction according to the invention;

FIGURE 12 is a substantially larger fragmentary sectional detail view taken substantially along the line XII—XII of FIGURE 11.

Figure 1:
FIGURE 1 is a side elevational view of the fibrous skeleton of a loofah fruit.
Figure 2:
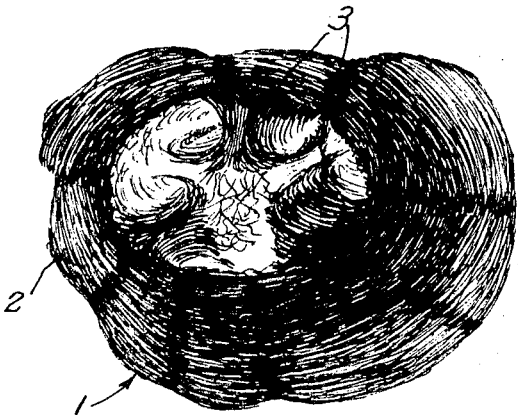
FIGURE 2 is an enlarged end view of the structure of FIGURE 1.

In FIGURE 1 I have shown the dry skeleton obtained from a gourd-like loofah fruit, the skeleton being indicated in general by numeral 1. The skeleton is generally of tubular shape, and contoured in accordance with the contour of the fruit from which it was taken. Externally the skeleton 1 is shallowly fluted as indicated at 2. These flutes, while somewhat visible in the finished filter medium, are really of no moment in the functioning of the completed product.

Inside thereof the skeleton has a core made up of a plurality of inwardly extending ribs 3 of the same fibrous construction as the remainder of the skeleton. Depending upon the size of the skeleton, it may be desirable to remove a portion or all of the ribs 3 particularly if they extend radially to a relatively large width, whereas if they extend radially to a lesser width they would not be removed but flattened into the skeletal body. Whether removed or not the ribs 3 will be discernible in the completed filter medium and whatever remains of these ribs will be slightly denser than the skeleton portion between the ribs.

Figure 3:
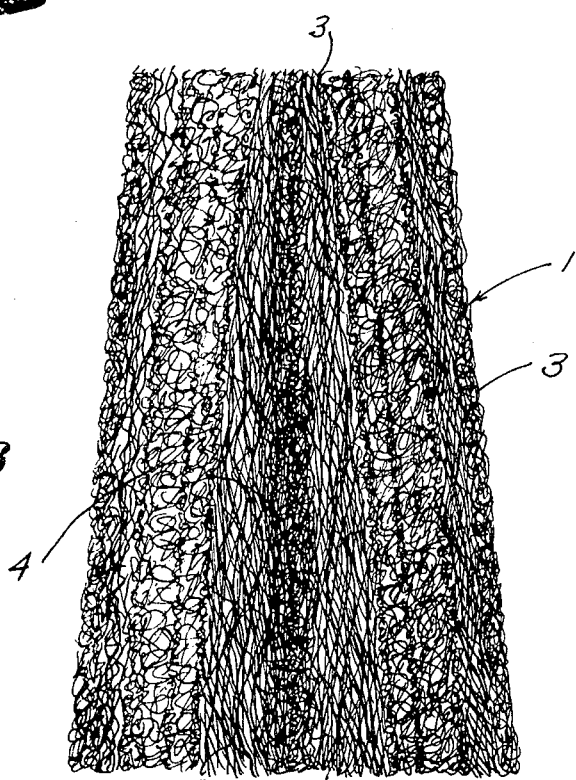
FIGURE 3 is the skeleton of FIGURE 1 split and flattened into sheet form.

The loofah skeleton is slit through a side thereof then opened up into a flat state pressed and steamed or sized and dried to maintain such flat sheet-like state to provide a blank 4 as a layer substantially compacted and reduced in thickness as compared to its original state, of filter material as shown in FIGURE 3. Such blanks are made in any desirable size depending upon the type of filter element to be used, and also depending upon the original skeleton size. In the flat sheet-like compacted state, the loofah skeleton and any remaining core material thereon is within opposite substantially flat plane surfaces. As a result, the dry layer is resiliently flexible so that it can be bent readily into desirable curvate shapes, if desired, in contrast to the original state skeleton which tends to resume the generally tubular form of its growth pattern and is thus unwieldy and of a generally rough contour, especially on its inner side. The dried, flat, substantially uniform and relatively thin layer of the compressed and dried skeleton lends itself to easy manipulation and bending across either the longitudinal or transverse plane or direction relative to the original rib structure. In the flattened, dried, compressed state, therefore, the skeleton can be easily handled, manipulated, combined and retaining and edging materials, secured, sewed, fastened, and the like. However, the greatest air filtering efficiency of the loofah material is in its substantially original state of thickness wherein the fibers are oriented in their generally haphazard directional orientations and connections, running every way within the skeletal outline and apparently having numerous offshoot hair-like fibrils extending into and through and across the interstitial areas between the main fibers. I have found that the flattened and compressed skeleton layer can be returned to the substantially original open porous efficient air filtration condition by moistening the loofah filtering medium after it has been supplied with the marginal binding and any other material desired in the end product, and generally before the filter has been put in use.

Figure 4:
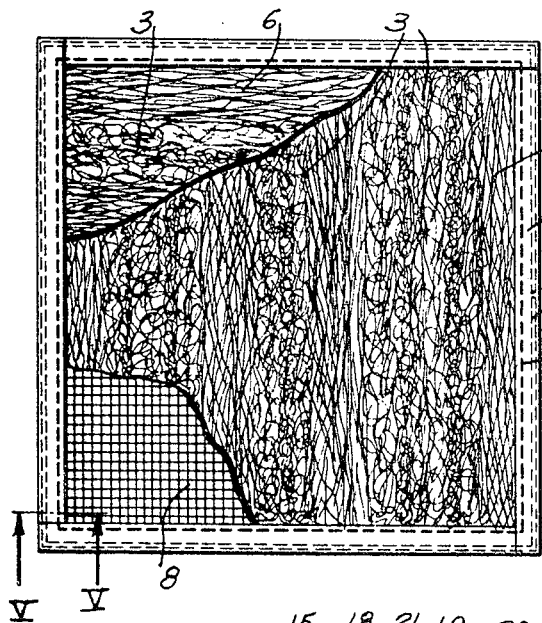
FIGURE 4 is a face view of a filter element in which the structure of FIGURE 3 is incorporated as a filter medium, the figure having parts broken away to illustrate parts therebeneath.
Figure 5:
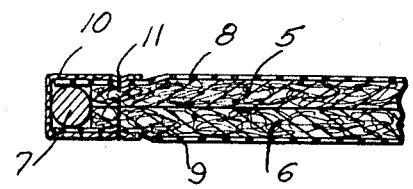
FIGURE 5 is a greatly enlarged fragmentary sectional view taken substantially as indicated by the line V—V of FIGURE 4, looking in the direction of the arrows.

In FIGURES 4 and 5 I have shown an air filter of the flat type, highly desirable for use in the ducts of furnace and air conditioning installations, the air filter being placed across the path of flowing air to remove dust and other contaminants before the air is permitted to exit. The filter medium may comprise a single layer that, as shown, comprises sheets 5 and 6 of loofah fiber disposed in face-to-face relationship providing a multi-layer filter medium. Each of the sheets 5 and 6 may be cut from one or more of the blanks 4 shown in FIGURE 3. It is preferable that the ribs 3 on the sheet 5 are not in confronting relationship with the ribs 3 in the sheet 6 so as to provide a more uniform filtering of passing air. This may be accomplished by placing the sheet 6 so that the ribs 3 therein are staggered relatively to the ribs 3 in the sheet 5, or, as seen in FIGURE 4, disposing the sheet 6 so that the ribs 3 there run transversely to the ribs of the sheet 5.

The two confronting sheets are then disposed within a frame 7 made of wire or some other sufficiently stiff material and each sheet is covered with a mesh or screen as shown at 8 and 9 which may be made of fabric, light wire or any other suitable material. Each of the screens 8 and 9 extends over the upper and lower faces of the frame 7 as seen in FIGURE 4. An air impervious U-shaped binding 10 is then secured to overlie the outer edge of the frame and margins of the screens 8 and 9, which binding may satisfactorily be secured in place while the layers or sheets 5 and 6 are in a flattened dried compressed condition, by a line of stitching 11 extending entirely through the structure inside the frame 7.

The filter is then desirably moistened, as by dipping it in water, to swell or expand the loofah material toward its original state, and the filter is ready for use and provides the manufacturing advantages and filtering advantages explained above. If occasions demand, the filter element may be washed, subjected to a blast of air in reverse to the direction of air travel, jarred to a reasonable and uninjurious extent, or cleansed in some other equivalent fashion. None of these operations will injure the fibers and fiber migration is prevented by the screens 8 and 9.

Obviously, various densities may be provided depending upon the original thickness and density of the skeleton, the compression utilized on the original blank 4, the extent to which the fibrous skeleton is permitted to return to the original state by moistening and then drying, and the number of layers of loofah fiber used in making the particular filter medium.

Figure 6:
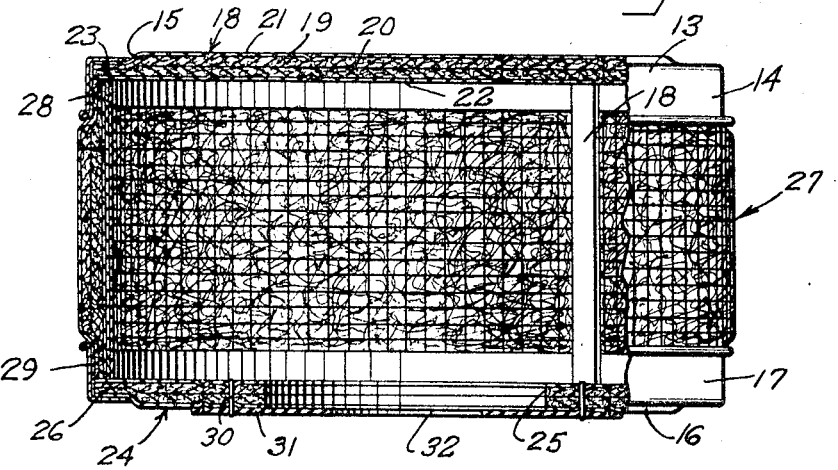
FIGURE 6 is a part vertical sectional, part elevational view of an air filter of different size and shape incorporating loofah fiber as a filter medium.

In FIGURE 6 I have shown a filter of the type highly desirable for use over the air intake pipe leading to the carburetor of an internal combustion engine, although the same type filter may be used with air compressors and other mechanism demanding a supply of clean air for its operation. In this instance the filter medium is contained in a cage comprising an upper annulus 13 having a depending skirt 14 thereon and a relatively large central opening 15 therein. A similar lower annulus 16 having an upstanding skirt 17 thereon is disposed below the annulus 13. The two annuli are connected by a plurality of spaced straps as indicated at 18, and the cage thus established is preferably made of metal, plastic, or some equivalent relatively rigid material.

With the structure of FIGURE 6, for convenience, three separate filter members are utilized to simplify manufacture. Each of these elements is formed in the manner above described including one or more layers of loofah fiber, with the exception that in the construction of FIGURE 6, the aforesaid frame 7 and binder 10 are not necessary.

An upper filter generally indicated by numeral 18 is provided comprising a pair of upper and lower loofah fiber sheets 19 and 20 covered respectively with screens 21 and 22 as described in connection with the previous embodiment. The sheets 19 and 20 are cut in the form of discs, and the marginal portion of the filter member 18 is compressed beneath the annulus 13 as indicated at 23. This filter member 18 completely covers the large opening 15 in the upper annulus 13. A bottom disc-type filter element 24 of the same construction as the element 18 is provided with the exception that this bottom element is provided with a central aperture 25 therein. The marginal portion of this element is compressed against the annulus 16 as indicated at 26.

The third so constructed filter member or element, generally indicated by numeral 27 is formed cylindrically and has its upper and lower margins 28 and 29 compressed within the skirts 14 and 17 respectively of the annuli. The three filter members may be secured to the interior of the annuli and their skirts adhesively or in an equivalent manner if so desired.

Secured to the lower face of the bottom filter member 24 as by staples 30 is a resilient disc 31 of less diameter than the central opening in the annulus 16 and having a central opening 32 of less diameter than the opening 25 in the lower filter member. This disc 31 is preferably of relatively strong rubber and may be resiliently engaged over an air intake pipe to mount the air cleaner thereon. Air enters the cleaner proper through the upper filter member 18 laterally through the cylindrical filter member 27 and through the bottom filter member 24 outside the resilient disc 31. All the filtering is accomplished with loofah fiber as the sole filter medium.

Figure 7:
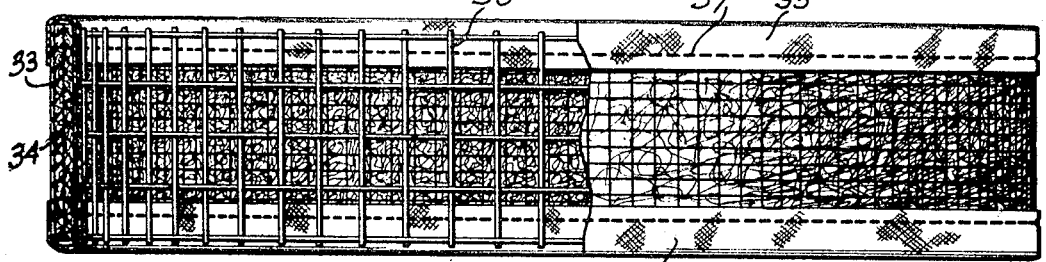
FIGURE 7 is a part sectional part elevational view of a filter element of still different form embodying loofah fiber as the filter medium.

In FIGURE 7 I have illustrated a form of filter highly desirable for use inside the casing of a combination air filter and carburetor silencer. In this instance the filter comprises sheets 33 and 34 of loofah fiber arranged as previously described and shaped in the form of a cylinder of relatively low height and relatively large diameter. These elements are covered on their non-confronting faces with the screen as above mentioned to prevent fiber migration and at their upper and lower edges are provided with bindings 35 and 36 each of which is U-shaped of air impervious material and secured to the loofah fiber sheets by a line of stitching as indicated at 37. For this construction an inner cylindrical grid 38 is provided which may be of metal wire, plastic, or other relatively rigid material. This grid gives support to the filter to enable it to withstand air sealing compression against the ends thereof. The supporting grid 38 may be secured to the filter element in any suitable manner as within the bindings 35 and 36 or the equivalent.

In FIGURE 8 is shown another version a filter 39 suitable for use with an automobile air cleaner and silencer 40 comprising a removable metal hood 41 having, in this instance, a rectangular air inlet opening 42 in its cylindrical wall. Over this opening is applied the filter 39 which is of complementary shape and of a size slightly larger in both directions than the opening so that a binding or frame 43 of the filter can be attached as by means of screws 44 to the wall of the hood 41.

Inside the frame 43 is desirably mounted a protective screen 45 which may be of suitable large mesh and made of wire, expanded metal, punch sheet metal, or the like. Inside the protective screen 45 is mounted a loofah filtering medium according to the invention, in this instance comprising two coextensive confronting loofah layers comprising an outer layer 47 and an inner layer 48 where the filter is for relatively heavy duty use, but where the filter is for only light duty service a single layer such as the outer layer 47 may suffice. About their margins the layers 47 and 48 are stitched together by stitching 49, which also secures over the faces and at least one edge of the filter medium assembly an open mesh retaining and protective netting 50 which may be relatively thin strand nylon, or the like.

As will be observed on comparison of FIGURES 9 and 10, in their initial form as worked into the filter medium the layers 47 and 48 are in the form of substantially uniform parallel compressed flat sheets. Thereby the sheets can be readily handled, easily manipulated in a sewing machine, suitable holes 51 punched therein for passage therethrough of the retaining screws 44 and the assembly completed with the frame 43. Then, the filter medium is moistened, and this may be effected by dipping the entire filter assembly 39 into a water bath wherein the loofah fibers quickly swell and expand the layers 47 and 48 from the flat, compressed form into the expanded efficient filtering form shown in FIGURE 9. When dried, this expanded form is retained.

In a desirable relationship, the filter medium layers 47 and 48 are so related that the confronting face of one of the layers, herein shown as the outer layer 47, has at least one of the ribbed areas, identified at 52, which appeared as a longitudinal strip of greater density in the flat compressed condition, located to expand toward and against the confronting face of the other layer 48. This results in the expanded rib 52 providing a spacer ridge between the two layers affording a substantial air space 53 between the layers within which a pressure drop occurs upon sucking in of air through the filter so that any particles and especially fine particles that may pass through the outer layers will by the air expansion in the space tend to drop from the air stream and collect on the fibers of the inner layer 48.

In assembly with the hood 41, the margins of the filter media are compressively clamped between the frame 43 and the hood wall, with inwardly extending flanges 54 on the frame serving as spacer stop means.

In FIGURE 11 is shown an arrangement comprising an air cleaner and silencer hood 55 having an intake tube 57 to which an air filter 58 on the order of the filter 27 of FIGURE 6 is detachably mounted. To this end, the filter 58 comprises a cage comprising a tubular spacer body 59 of substantially stiff large open mesh wire, with the opposite ends of which are assembled similar or lighter outer and inner end discs 60 and 61 respectively, with respective outer and inner binding frame annuluses 62 and 63 maintaining an assembled relationship of the cage and secured in place by the respective angularly spaced tie bolts 64.

For removable self-retention of the filter 58 on the air intake duct 57 an elastometric disc 65 is secured by clamping its margin firmly between the inner mesh end disc 61 and the inner frame ring 63. Centrally, the elastometric disc 65 has an opening 67 which is smaller than the diameter of the tube 57 or at least is so shaped that the end of the tube 57 and an annular lateral outwardly extending flange 68 thereon can be forced through the opening 67 to engage the flange 68 retainingly between the screen 61 and the retaining disc 65 and with a flange 69 on the retaining disc about the opening 67 stretched over and about and grippingly maintaining a retaining engagement by its tension against the tube and toward the flange 68 thereof.

Within the cage of the filter 58 are mounted several layers of the loofah filtering material, in this instance comprising single layers inasmuch as this filter affords large surface area for indrawing of air and there is not the relatively small area concentration for air entry as in some of the other described arrangements in which multiple layers are advantageous. To this end, a tubular filtering medium loofah layer 70 is engaged within and substantially coextensive with the tubular body screen 59. Disposed in confronting relation to the outer end screen 60 is a filtering medium loofah disc layer 71 substantially coextensive with such end disc. In order to anticipate possible unloading of the filter elements 70 and 71 by abusively lengthy use of the filter without cleaning, and for uses where unusual suction surges may be encountered, a secondary filtering medium disc 72 of the loofah material is mounted in substantially coextensive relation to the inner face of the inner end screen 61 and extends across the mouth of the air intake tube 57. Since the contiguous edges of the filter medium layers 70, 71 and 72 are firmly engaged together free air passages thereabout are precluded so that all air passing into and through the filter 58 into the intake tube 57 must pass through and be filtered by the respective filter medium layers.

When the loofah filtering layers 70, 71 and 72 are initially assembled within the cage of the filter 58, they are preferably in the flattened, compressed, readily manipulatable state as hereinbefore described and as indicated in dash lines in FIGURE 12. After the assembly has been completed and the loofah layers expanded by moistening, the generally swelled condition thereof is substantially as indicated in full outline of FIGURE 12. Desirably a covering wide open mesh flexible fabric 73 may be applied to the filter layers 70 and 71. A thin screen disc 74 may be disposed between the end screen 61 and the disc 72 as a retainer over the relatively large openings in the supporting screen 61.

Other shapes and sizes of filter elements embodying a filter medium made up of one or more layers of loofah fiber may be made in an economical fashion as is the case with the several air filter embodiments set forth and described herein. In each instance loofah fiber functions as the filter medium, and in each instance the air filter provides the advantages in manufacturing and in use above set forth.

It will be understood that modifications and variations may be effected without departing from the scope of the novel concepts of the present invention.

I claim as my invention:

1. A method of making an air filter which comprises: assembling a dry compressed flattened loofah skeleton layer filter medium and a retaining structure together; and
thereafter moistening and swelling the layer toward its original uncompressed condition and drying the same.

2. The method of claim 1, in which said structure comprises a binding, and stitching said binding onto said layer while the layer is in the compressed flattened dry condition.

3. The method according to claim 1, comprising applying two of the loofah skeleton layers in the flattened compressed condition in substantially coextensive confronting face-to-face relation, securing the layers together and assembling them with said structure, and then moistening both of the layers.

4. The method according to claim 1, comprising assembling two of the dry compressed flattened loofah skeleton filtering medium layers and retaining structure together and with a flattened rib area of greater density on one of said layers, moistening and swelling both of said layers and said flattened rib area, and expanding said rib area into a spacer rib between and thrusting toward the other of said layers.

(References on following page)

References Cited

UNITED STATES PATENTS

| | | | |
|---|---|---|---|
| 1,762,010 | 6/1930 | Carlson | 55—512 X |
| 1,912,235 | 5/1933 | Winslow | 55—487 X |
| 2,008,568 | 7/1935 | Nutting | 55—489 |
| 2,064,097 | 12/1936 | White. | |
| 2,320,990 | 6/1943 | White | 210—458 |
| 2,574,221 | 11/1951 | Modigliani | 55—489 X |
| 2,604,311 | 7/1952 | Summerhill | 55—529 X |
| 2,685,345 | 8/1954 | Lindner | 55—515 |
| 2,888,095 | 5/1959 | Perrini et al. | 55—528 X |
| 2,941,620 | 6/1960 | Thornburgh | 55—502 X |
| 1,750,446 | 3/1930 | Wallace et al. | 55—363 X |
| 2,551,923 | 5/1951 | Berge | 55—505 X |
| 2,627,935 | 2/1953 | Beach | 55—482 X |
| 2,988,168 | 6/1961 | Wittemeier et al. | 55—488 |

FOREIGN PATENTS 907,236  10/1962  Great Britain.

HARRY B. THORNTON, Primary Examiner

U.S. Cl. X.R.

55—522